(12) United States Patent
Takamatsu (10) Patent No.: US 8,939,391 B2
(45) Date of Patent: Jan. 27, 2015

(54) SPINNING REEL BODY AND SPINNING REEL

(71) Applicant: Shimano Inc., Sakai, Osaka (JP)

(72) Inventor: Takuji Takamatsu, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/031,708

(22) Filed: Sep. 19, 2013

(65) Prior Publication Data

US 2014/0175207 A1   Jun. 26, 2014

(30) Foreign Application Priority Data

Dec. 20, 2012 (JP) ................. 2012-277876

(51) Int. Cl.
*A01K 89/01* (2006.01)
(52) U.S. Cl.
CPC ..................... *A01K 89/01* (2013.01)
USPC .......................... 242/311; 242/310
(58) Field of Classification Search
CPC ..................................... A01K 89/01
USPC ........................ 242/310, 311, 319
See application file for complete search history.

(56) References Cited

U.S. PATENT DOCUMENTS

| | | | |
|---|---|---|---|
| 6,457,662 B1 * | 10/2002 | Sato ............................. | 242/247 |
| 6,598,819 B2 * | 7/2003 | Furomoto ..................... | 242/319 |
| 6,629,655 B2 * | 10/2003 | Kitajima ....................... | 242/311 |
| 7,028,937 B2 * | 4/2006 | Hitomi et al. ................ | 242/311 |
| 7,607,602 B2 * | 10/2009 | Hiraoka et al. .............. | 242/232 |
| 7,926,756 B2 * | 4/2011 | Bin Ahmad et al. .......... | 242/319 |
| 2002/0056776 A1 * | 5/2002 | Sugawara ..................... | 242/231 |
| 2002/0170997 A1 * | 11/2002 | Furomoto ..................... | 242/246 |
| 2003/0066920 A1 * | 4/2003 | Kitajima ....................... | 242/310 |
| 2004/0200917 A1 * | 10/2004 | Nishikawa .................... | 242/311 |
| 2004/0232265 A1 * | 11/2004 | Morise ......................... | 242/311 |
| 2008/0149750 A1 | 6/2008 | Kitajima et al. | |
| 2008/0308663 A1 * | 12/2008 | Hiraoka et al. ............... | 242/233 |

FOREIGN PATENT DOCUMENTS

| EP | 1508275 A1 | 2/2005 |
|---|---|---|
| JP | 2004-129571 A | 4/2004 |

OTHER PUBLICATIONS

European Search Report of corresponding EP Application No. 13 19 5467.9 dated Mar. 14, 2014.

* cited by examiner

*Primary Examiner* — Emmanuel M Marcelo
(74) *Attorney, Agent, or Firm* — Global IP Counselors (57) ABSTRACT

A spinning reel body of a spinning reel includes a housing, a cover member, and a guard member. The housing has an internal housing space, a sidewall that forms a side face of the housing space, and a rear wall that forms a rear face of the housing space. The housing space has an open side opposite the side face formed by the sidewall. The sidewall has a rear portion extending beyond the rear wall in a rearward direction. The cover member is mounted to the housing and covers the open side of the housing space. The guard member is mounted at the rear wall of the housing and at a rear portion of the cover member to form a space between the rear portion of the sidewall and the rear wall of the housing.

11 Claims, 8 Drawing Sheets

SPINNING REEL BODY AND SPINNING REEL

CROSS-REFERENCE TO RELATED APPLICATIONS

This application claims priority under to Japanese Patent Application No. 2012-277876, filed on Dec. 20, 2012. The entire disclosure of Japanese Patent Application No. 2012-277876 is hereby incorporated herein by reference.

BACKGROUND

1. Field of the Invention

The present invention relates to a spinning reel body of a spinning reel that delivers fishing line forward and a spinning reel that uses this reel body.

2. Background Information

A reel body of a spinning reel includes a housing that has a housing space for housing an oscillating mechanism, a rotor drive mechanism, or the like, a cover member mounted to the housing so as to close the opening formed in the housing, and a guard member that covers the rear portion of the cover member (refer to Japanese Laid Open Patent Publication No. 2004-129571). For design purposes and to prevent the fishing line from becoming tangled, this housing has a shape wherein the side view becomes narrower toward the rear portion.

SUMMARY

The housing space in the housing is preferably made small from the standpoint of preventing infiltration of water into the housing space. For example, the housing space can be made small by shifting the rear face of the housing space forward. However, greatly changing the external shape in the side view of the housing rear portion is not favorable in view of the considerations described above. When the rear face of the housing space is shifted forward without greatly changing the external shape in the side view of the housing rear portion to satisfy this need, extra thickness is necessary by the amount the housing space was decreased according to the shift in the rear portion of the housing space, and this creates a problem of increasing the weight.

The object of the present invention is to reduce the weight of the reel body without forfeiting the design and functionality of the rear portion of the reel body.

The spinning reel body according to the first aspect of the present invention is a reel body of a spinning reel for delivering fishing line forward and that comprises a housing, a cover member, and a guard member. The housing has an internal housing space, a sidewall that forms a side face of the housing space, and a rear wall that forms a rear face of the housing space. The housing space has an open side opposite the side face firmed by the sidewall. The sidewall has a rear portion extending beyond the rear wall in a rearward direction. The cover member is mounted to the housing and covers the open side of the housing space. The guard member is mounted at the rear wall of the housing and at a rear portion of the cover member to form a space between the rear portion of the sidewall and the rear wall of the housing.

According to this configuration, the rear portion of the sidewall extends more toward the rear than the rear wall, and the rear portion of the housing can have approximately the same external appearance as that of the conventional art. Also, the rear wall is positioned more toward the front than the rear end of the housing. Therefore, the guard member can be mounted to the housing in a state of having formed a space between the rear portion of the sidewall and the rear wall of the housing. Accordingly, decreasing the weight of the reel body is made possible without forfeiting the design and functionality of the rear portion of the reel body.

The spinning reel body according to a second aspect of the present invention relates to the reel body according to the first aspect, wherein the rear portion of the cover member extends beyond the rear wall of the housing in the rearward direction. According to this configuration, a space is formed at the rear portion of the reel body from the rear portion of the sidewall and the rear wall of the housing, the rear portion of the cover member, and the guard member. Accordingly, decreasing the weight of the reel body is made possible without forfeiting the design when viewed from the side mounted with the cover member.

The spinning reel body according to a third aspect of the present invention relates to the reel body according to the first or second aspect, wherein the guard member has at least one protruding portion that protrudes forward relative to the rearward direction. Also, the protruding portion is arranged to contact an inside face of the rear portion of the sidewall. According to this configuration, even in a case when a load is applied to the guard member from the side, a sideways movement of the guard member is restricted by the protruding portion making contact with the inside face of the rear portion of the housing. Therefore, a sideways displacement in the position of the guard member can be prevented. Furthermore, the protruding portion can make contact with the inside face of the rear portion of the housing or be disposed to be adjacent to the inside face of the rear portion of the housing in advance.

The spinning reel body according to a fourth aspect of the present invention relates to the reel body according to the second aspect, wherein the guard member has a plurality of protruding portions, each of the protruding portions protruding forward. Each protruding portion is arranged to contact an inside face of the rear portion of the housing or an inside face of the rear portion of the cover member. According to this configuration, even in a case when a load is applied to the guard member from the side, a sideways movement of the guard member is restricted by the protruding portion making contact with the inside face of the rear portion of the housing or with the inside face of the rear portion of the cover member. Therefore, a sideways displacement in the position of the guard member can be prevented. Furthermore, the protruding portion can make contact with the inside face of the rear portion of the housing or with the inside face of the rear portion of the cover member or be disposed to be adjacent to the inside face of the rear portion of the housing or the inside face of the rear portion of the cover member in advance.

The spinning reel body according to a fifth aspect of the present invention relates to the reel body according to the second aspect, wherein the rear portion of the cover member and the rear portion of the sidewall have matching shapes as viewed in a side devotional view of the reel body. According to this configuration, the reel body is bilaterally symmetrical. Therefore, the design is enhanced, the shape of the guard member mounted to the rear portion of the housing can have as close to a bilaterally symmetrical shape as possible, and extreme unbalance can be avoided.

The spinning reel body according to a sixth aspect of the present invention relates to the reel body according to any one of the aspects 1 to 5, wherein the front face of the guard member has a shape that follows along a rear face of the rear portion of the sidewall and a rear face of the rear portion of the cover member as viewed in a side elevational view of the reel body. According to this configuration, the adhesion is enhanced when the guard member is mounted to the housing and the cover member, and the strength of the guard member is enhanced at the time of mounting.

A spinning reel according to a seventh aspect of the present invention comprises the spinning reel body according to any one of the aspects 1 to 6, a handle that is rotatably mounted to the spinning reel body, a spool configured to have fishing line wound thereon, and a rotor operatively coupled between the handle and the spool to wind the fishing line on the spool. According to this configuration, the reel body in the first aspect is provided. Therefore, the weight can be reduced without forfeiting the design and functionality.

According to the present invention, the weight of the housing can be reduced without forfeiting the design and functionality of the rear portion of the reel body. Other objects, features, aspects and advantages of the disclosed reel body will become apparent to those skilled in the art from the following detailed description, which, taken in conjunction with the annexed drawings, discloses preferred embodiments of the reel body.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Below, embodiments of a spinning reel 100 related to the present invention will be described by referring to the drawings. In the description below, "front" refers to the left in FIGS. 1 to 6 (excluding FIG. 3); "rear" refers to the right in FIGS. 1 to 6 (excluding FIG. 3); "top" refers to the top in FIGS. 1 to 6 (excluding FIG. 3); and "bottom" refers to the bottom in FIGS. 1 to 6 (excluding FIG. 3).

Configuration of the Spinning Reel

Figure 1:
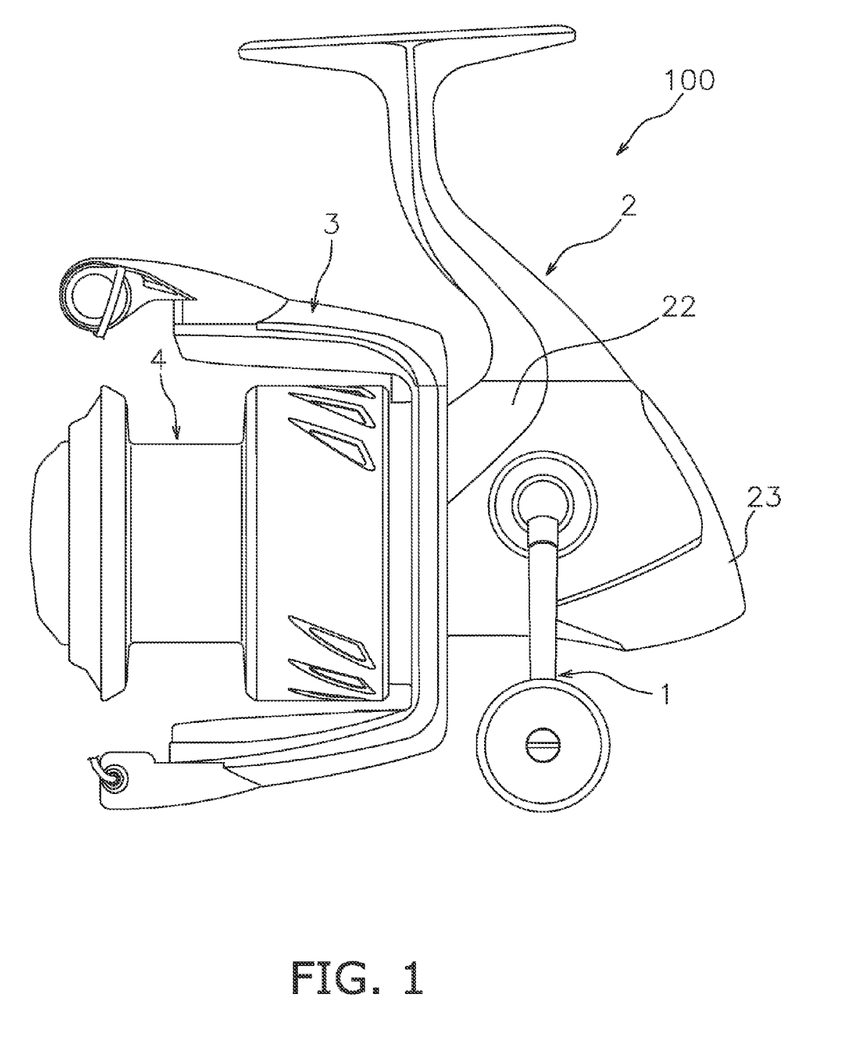
FIG. 1 is a side elevational view of a spinning reel.

The spinning reel 100 is a reel capable of delivering fishing line forward. As illustrated in FIG. 1, the spinning reel 100 includes a handle 1, a spinning reel body 2 that rotatably supports the handle 1, a rotor 3, and a spool 4. The rotor 3 is rotatably supported at the front portion of the reel body 2. The spool 4 is for winding fishing line on the peripheral surface and is disposed at the front portion of the rotor 3 to freely move in the lengthwise direction. The handle 1 can be mounted at the left or the right side of the reel body 2.

Configuration of the Reel Body

The reel body 2 includes a housing 21, a cover member 22, and a guard member 23.

Figure 2:
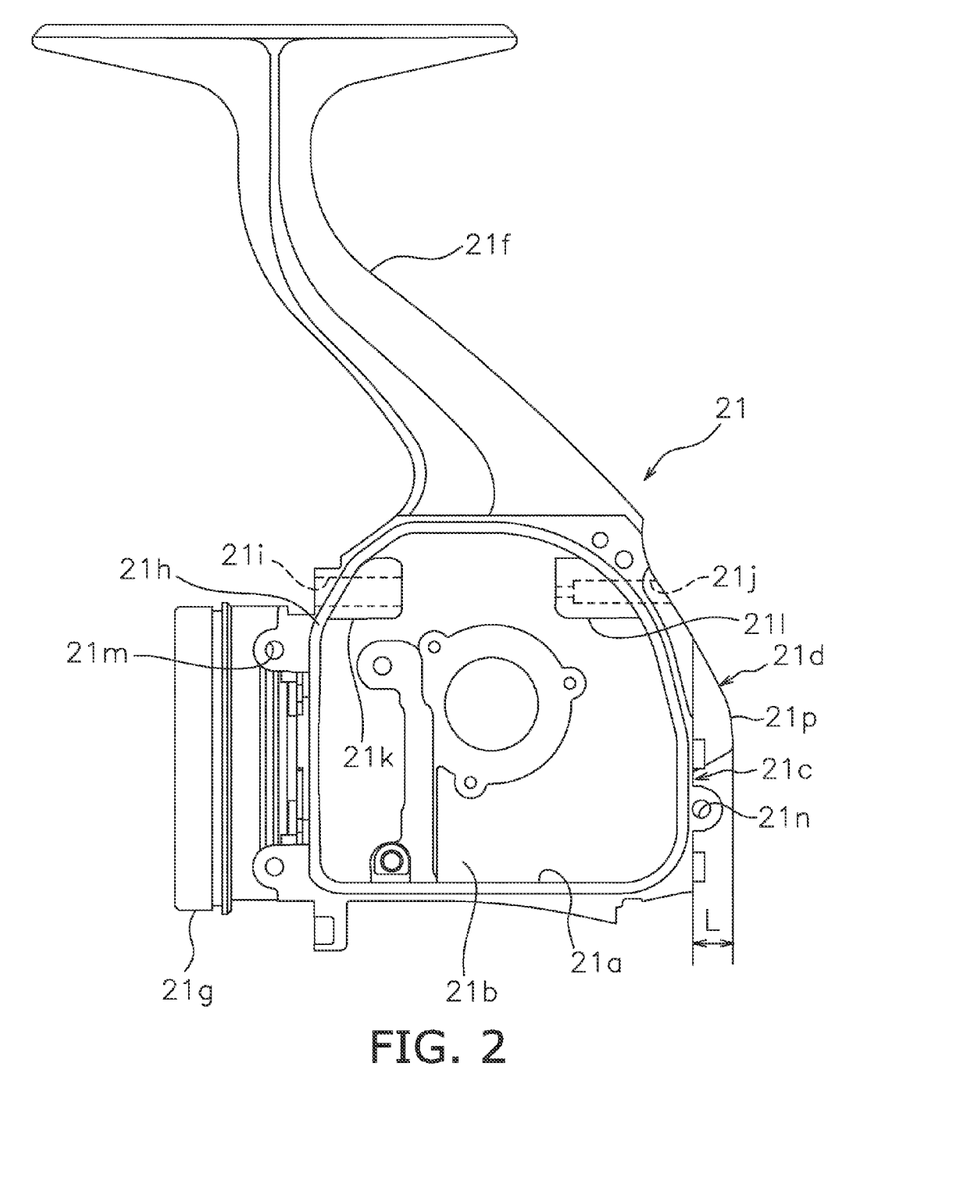
FIG. 2 is a side elevational view of a housing of the spinning reel of FIG. 1.

The housing 21 is formed, for example, from a light alloy such as a magnesium alloy, an aluminum alloy, or the like. As illustrated in FIG. 2, the housing 21 has a housing space 21a wherein the first side face (the frontal side in FIG. 2) is opened. The housing space 21a is roughly square-shaped. This housing space 21a houses the rotor drive mechanism 5 and the oscillating mechanism 6 to be described later.

Figure 3:
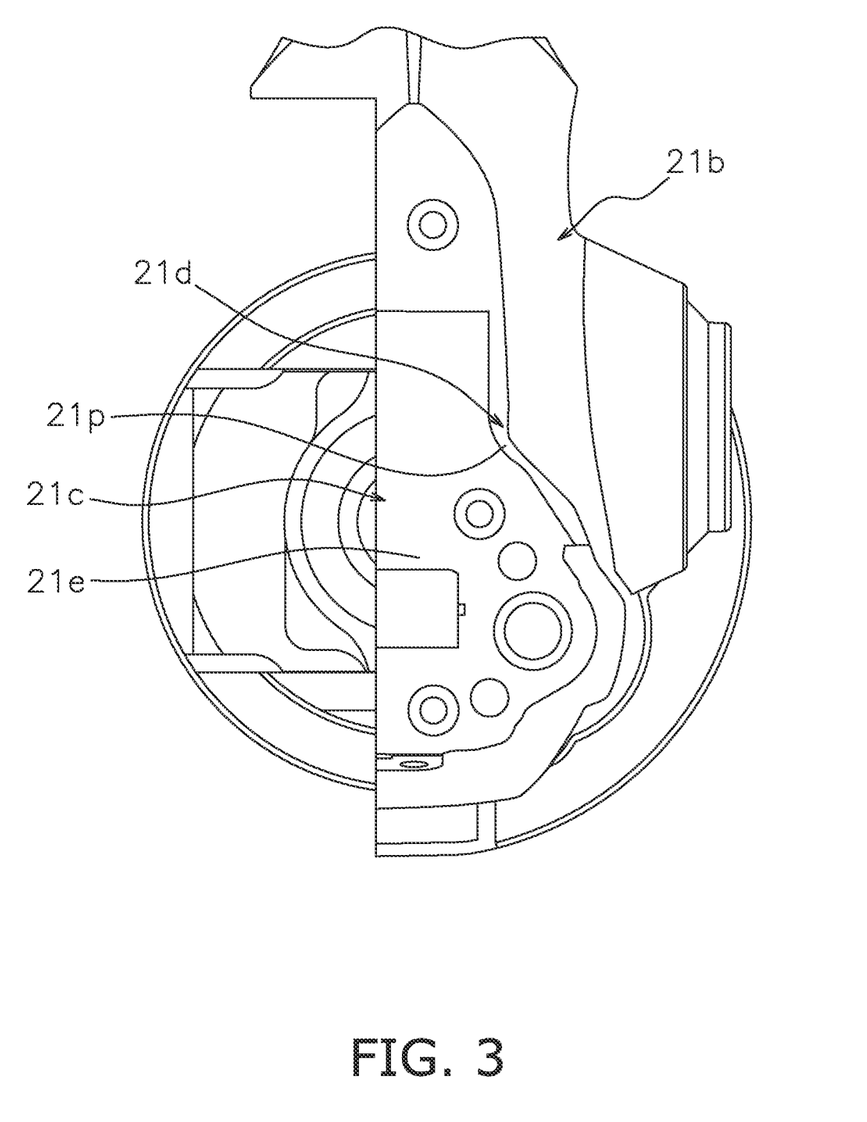
FIG. 3 is a back view of the housing of FIG. 2.

As illustrated in FIGS. 2 and 3, the housing 21 includes a sidewall 21b that demarcates the second side face (the side face that is the back side in FIG. 2) of the housing space 21a and a rear wall 21c that demarcates the rear face of the housing space 21a. The second side face opposes the first side face. The sidewall 21b has a flat protruding piece (one example for the rear portion of the sidewall) 21d that extends more to the rear than the rear wall 21c. The protruding piece 21d has a side view that is roughly triangle-shaped, and the apex is located at the rear end thereof. The thickness of the protruding piece 21d is preferably not less than 1 mm and not greater than 4 mm. If the thickness of the protruding piece 21d is greater than 1 mm, the housing 21 can be easily molded according to a die casting process. Also, if the thickness of the protruding piece 21d is less than 4 mm, the weight can be reduced, and the generation of shrinkage after molding can be suppressed when the housing 21 is molded according to a die casting process.

The rear face 21e of the rear wall 21c is substantially flat-shaped. The length from this rear face 21e to the rear end of the protruding piece 21d, namely, the length L in the lengthwise direction of the protruding piece 21d, is preferably greater than 2 mm and less than 10 mm. Also, the housing 21 includes a T-shaped fishing pole mounting portion 21f that extends in the lengthwise direction, a cylindrical portion 21g for housing an anti-reversal mechanism 50, or the like.

As illustrated in FIG. 2, the housing 21 has a front wall 21h that demarcates the front face of the housing space 21a. A first communicating hole 21i that links the housing space 21a to the outside is formed on the front wall 21h. Also, a second communicating hole 21j that links the housing space 21a to the outside is formed on the rear wall 21c of the housing 21 at a position that opposes the first communicating hole 21i.

The first communicating hole 21i is formed from a round hole that has a minor diameter that allows a bolt 24 (FIG. 6) to pass through. The first communicating hole 21i is formed on a first protruding portion 21k that protrudes from the front wall 21h of the housing 21 toward the second communicating hole 21j. The first communicating hole 21i is closed with a plug member 25 (FIG. 6) after the guard member 23 has been mounted with a bolt 24.

The second communicating hole 21j is formed on a second protruding portion 21l that protrudes from the rear wall 21c of the housing 21 toward the first communication hole 21i. The second communicating hole 21j is a stepped hole formed to include a large diameter portion and a small diameter portion, and a boss portion 23a of the guard member 23 to be described later is inserted into the large diameter portion. Also, the shaft portion 24b of the bolt 24 can be inserted into the small diameter portion of the second communicating hole 21j.

Figure 4:
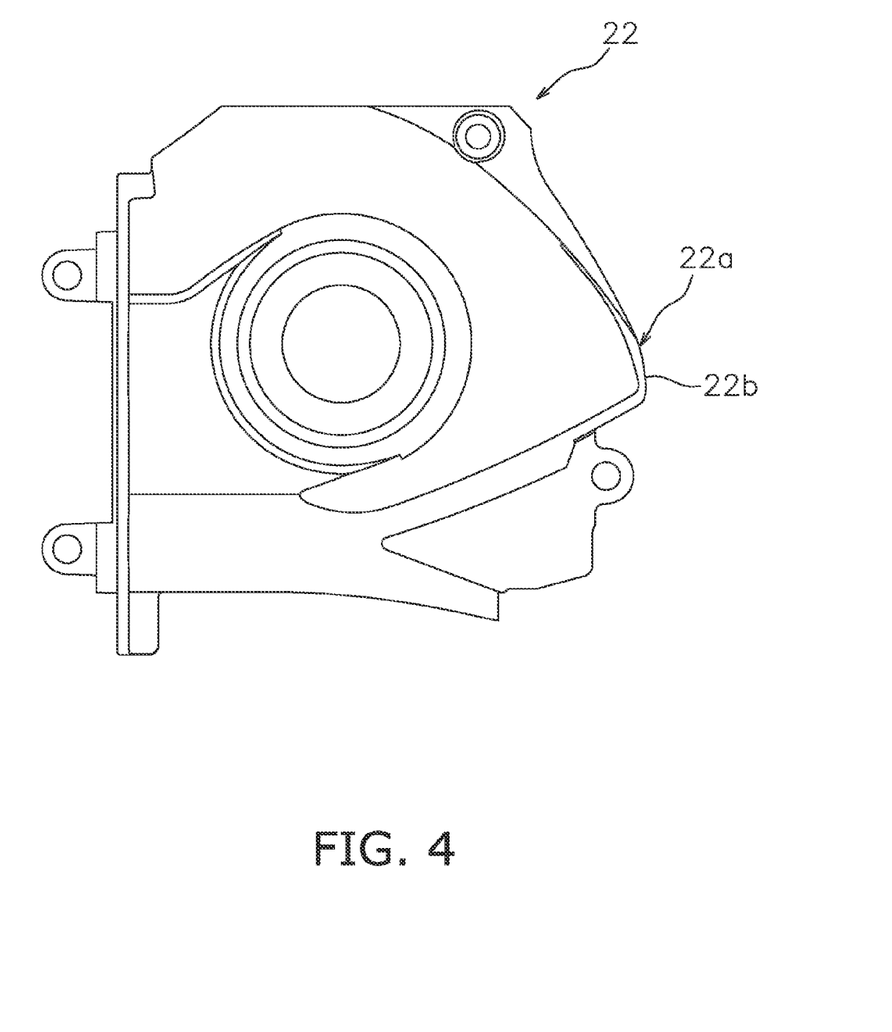
FIG. 4 is a side view of a cover member of the spinning reel of FIG. 1.

The cover member 22 is detachably mounted to the housing 21 to close the opening of the housing space 21a. The cover member 22 is made, for example, from a light alloy such as a magnesium alloy, an aluminum alloy, or the like. As illustrated in FIG. 4, the cover member 22 is fixed to the housing 21, for example, at two spots on the front side hidden by the rotor 3 with two bolts that are not illustrated in the drawing. The two bolts on the front side are screwed to the two threaded holes 21m formed in the front portion of the housing 21. Also, the cover member 22 is fixed to the housing 21 at one spot on the rear side that is separated from the rotor 3 with a bolt not illustrated in the drawing. The bolt on the rear side is screwed to the threaded hole 21n formed to the rear portion of the housing 21. The bolt on the rear side is covered according to the guard member 23. Therefore, the bolt that fixes the cover member 22 is not exposed to the outside of the reel body 2.

The cover member 22 has a rear portion 22a that is positioned more to the rear than the rear wall 21c of the housing 21 when in a state of having been mounted to the housing 21. This rear portion 22a is roughly triangle-shaped, that is, roughly the same shape as the protruding piece 21d of the housing 21 when viewed from the side (i.e., as viewed in a side elevational view of the reel body 2). The cover member 22 demarcates the first side face of the housing space 21a when in a state of having been mounted to the housing 21.

Figure 5:
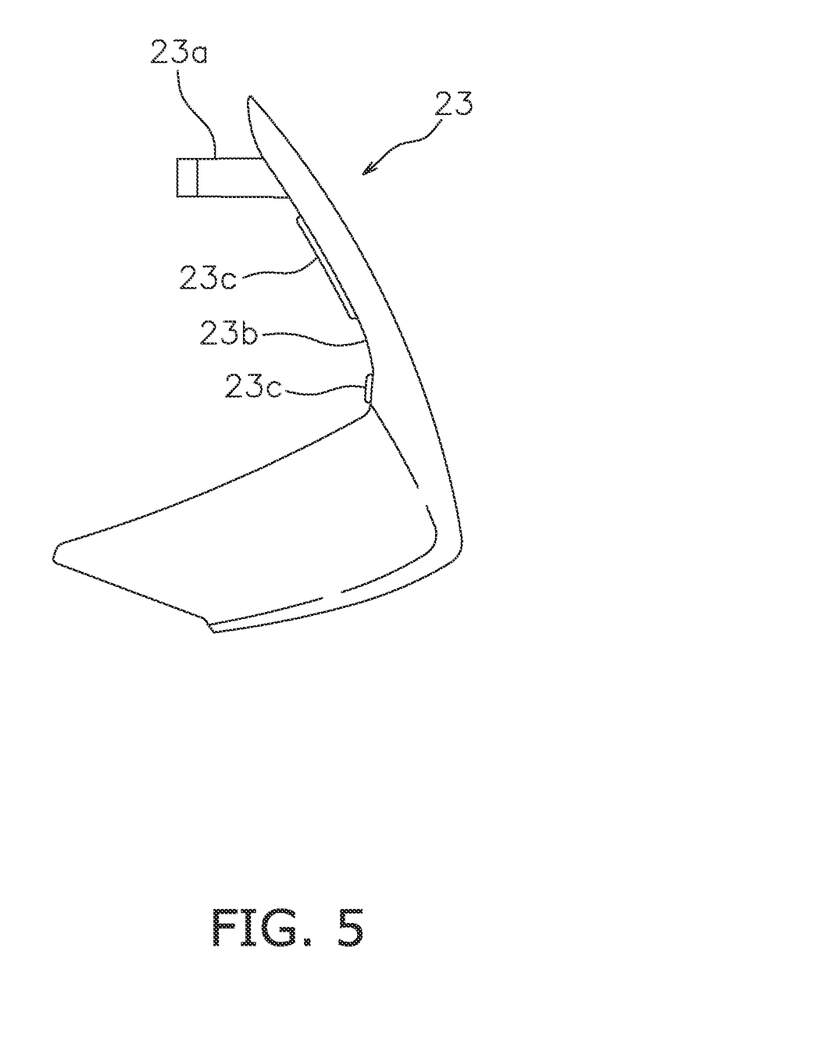
FIG. 5 is a side view of a guard member of the spinning reel of FIG. 1.

The guard member 23 is the member that is mounted to the housing 21 and the cover member 22 from the rear. The guard member 23 forms the rear portion of the reel body 2 and has a boomerang shape when viewed from the side. Furthermore, the external shape as viewed from the right side and the external shape as viewed from the left side are approximately the same in the side view of the guard member 23.

For appearance, the guard member 23 is mounted to the housing 21 and the cover member 22 via a seal not illustrated in the drawing. The boss portion 23a of the guard member 23 is formed into a rod shape such that a bolt 24 can be screwed in at the center. The boss portion 23a protrudes forward and can be inserted into the second communicating hole 21j. Specifically, the boss portion 23a can be inserted into the large diameter portion of the second communicating hole 21j as described above. A threaded hole whereto the bolt 24 is screwed in is formed at the center of the boss portion 23a. The threaded hole of this boss portion 23a extends to the middle position in the axial direction of the boss portion 23a. The boss portion 23a has a length that allows for a difference in level and formation of the space between the first hole portion 21m and the second hole portion 21n when the guard member 23 is fixed. Also, the guard member 23 is formed with a stepped through hole (omitted from the drawings) at the bottom portion, and the bottom portion is screwed to the housing 21 by using this through hole.

The front face 23b of the guard member 23 has a shape that follows along a rear face 21p of the protruding piece 21d and a rear face 22b of the rear portion 22a of the cover member 22. Also, the guard member 23 has a plurality of protruding portions 23c protruding forward. Each protruding portion 23c is disposed at a position capable of making contact with the inside face of the protruding piece 21d and the inside face of the cover member 22, namely, at a position that approaches or makes contact with the inside face of the protruding piece or the cover member. A space is formed by the housing 21, the cover member 22, and the guard member 23 when the guard member 23 is mounted at the rear of the housing 21 and the cover member 22.

Figure 7:
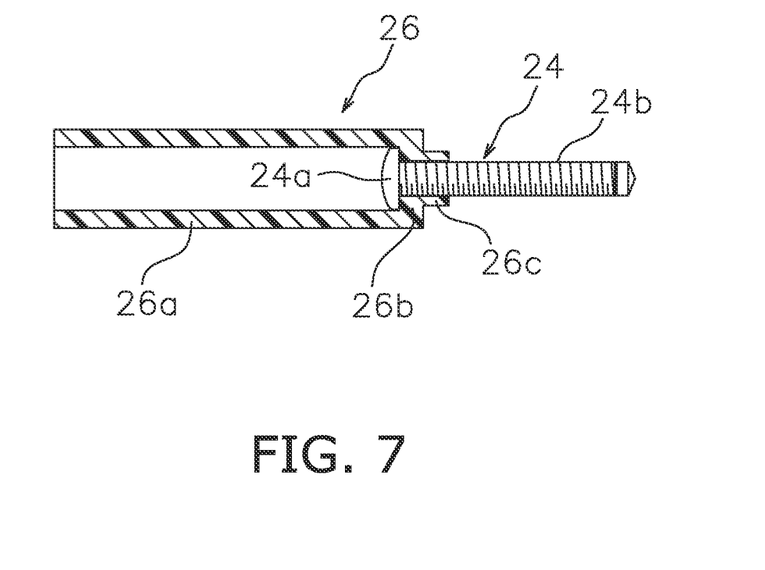
FIG. 7 is a longitudinal cross-sectional view of a cylindrical member in a state where a bolt is mounted.

As illustrated in FIG. 7, the bolt 24 has a head portion 24a and a shaft portion 24b. The shaft portion 24b has a diameter that is smaller than that of the head portion 24a and a male thread formed on its periphery. The bolt 24 is screwed to the threaded hole formed to the boss portion 23a. The bolt 24 is mounted to a cylindrical member 26 before assembling the spinning reel. At the time of the assembly, the extreme end of a fastening tool, such as a driver or the like, is inserted into the cylindrical member 26 via the first communicating hole 21i and is screwed to the boss portion 23a of the guard member 23 by turning the bolt 24 with the fastening tool. Accordingly, the guard member 23 and the cylindrical member 26 are fixed to the housing 21.

The plug member 25 is made from an elastic body, such as synthetic rubber or the like, and seals the space between the cylindrical member 26 and the first communicating hole 21i by being fitted to the respective inner circumferential surface of the first communicating hole 21i and the cylindrical portion 26a of the cylindrical member 26. It is possible with this plug member 25 to prevent liquid from infiltrating into the housing space 21a from the inside of the cylindrical member 26, as well as to prevent the infiltration of liquid into the housing space 21a from the first communicating hole 21i.

The cylindrical member 26 is a member made from, for example, a synthetic resin such as a polyamide resin, polyacetal, or the like. The cylindrical member 26 is disposed between the first communicating hole 21i and the second communicating hole 21j in the housing space 21a of the housing 21. As illustrated in FIG. 7, the cylindrical member 26 has a cylindrical portion 26a into which the head portion 24a of the bolt 24 can be inserted, a bottom portion 26b, and a seal mounting portion 26c. The cylindrical potion 26a has a hole that is substantially the same diameter as that of the first communicating hole 21i. The bottom portion 26b is disposed to oppose the front face of the second protruding portion 21l. The bottom portion 26b has a through hole wherein the shaft portion 24b of the bolt 24 can be inserted and has substantially the same diameter as the small diameter portion of the second communicating hole 21j. The bottom portion 26b can fasten the head portion 24a of the bolt 24. The seal mounting portion 26c protrudes in a cylindrical shape from the bottom portion 26b toward the second protruding portion 21l. The extreme end portion of the seal mounting portion 26c is disposed so as to make contact with the second protruding portion 21l.

The second seal member 27 is an O-ring that is mounted to the seal mounting portion 26c and seals the space between the cylindrical member 26 and the second communicating hole 21j. The second seal member 27 is sandwiched between the bottom portion 26b and the second protruding portion 21l and is slightly compressed in a state in which the rear side of the seal mounting portion 26c makes contact with the front face of the second protruding portion 21l. Accordingly, the second seal member 27 seals the space between the bottom portion 26b and the second protruding portion 21l. As a result, infiltration of liquid into the housing space 21a from the cylindrical member 26 can be prevented even if liquid infiltrates into the second communicating hole 21j.

In this reel body 2, the bolt 24 for attaching the guard member 23 is covered with a plug member 25. Accordingly, it is possible to obtain a clean outer appearance wherein the bolt 24 is not exposed to the outside. Also, the space between the first communicating hole 21i and the cylindrical member 26 is sealed with the plug member 25, and the space between the second communicating hole 21j and the cylindrical member is sealed with the second seal member 27. Accordingly, it is possible to suppress the infiltration of liquid into the housing space 21a and to easily fasten the guard member 23 without exposing the bolt 24 to the outside. Also, even the threaded member for fixing the cover member 22 to the housing 21 is hidden by the rotor 3, and the guard member 23 and fastening bolts thereof are not exposed to the outside.

Configuration of the Spinning Reel, Etc.

Figure 6:
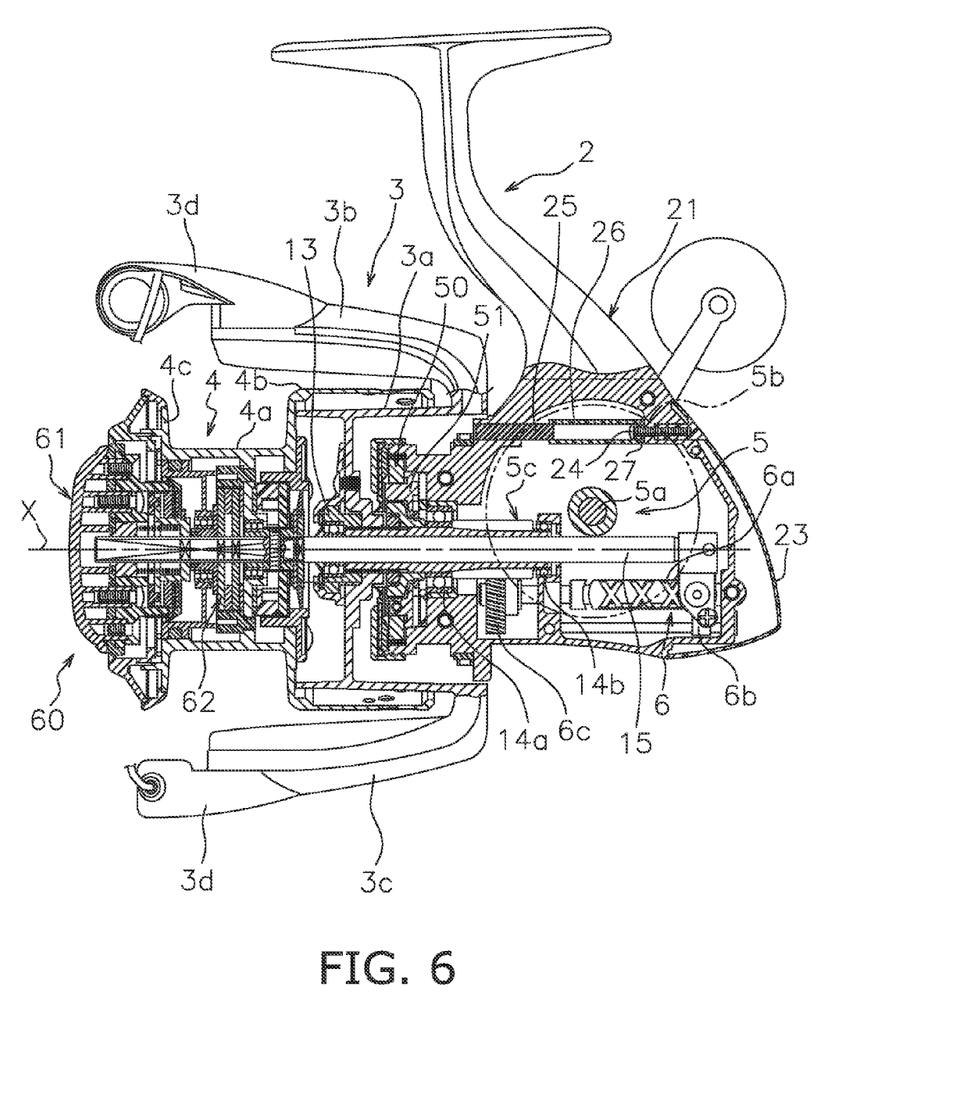
FIG. 6 is a longitudinal cross-sectional view of the spinning reel.

As illustrated in FIG. 6, the rotor drive mechanism 5 includes a drive shaft 5a, a drive gear 5b in the form of a face gear that is integrally installed to the drive shaft 5a or as a separate member, and a pinion gear 5c that interlocks with the drive gear 5b.

The pinion gear 5c is formed into a cylindrical shape, and the front portion of the pinion gear 5c passes through the center portion of the rotor 3 and is fixed to the rotor 3 with a nut 13. Also, the middle portion and the rear end portion in the axial direction of the pinion gear 5c are rotatably supported by the reel body 2 via the bearings 14a and 14b, respectively.

The oscillating mechanism 6 is a mechanism for moving the spool shaft 15 that is coupled to the center portion of the spool 4 via a drag mechanism 60 in the lengthwise direction, thereby moving the spool 4 in the same direction. The oscillating mechanism 6 includes a traverse camshaft 6a that is disposed below the spool shaft 15 to be parallel to the spool shaft, a slider 6b that moves in the lengthwise direction along the traverse camshaft 6a, and a middle gear 6c that is fixed to the extreme end of the traverse camshaft 6a. The rear end portion of the spool shaft 15 is rotatably fixed to the slider 6b. The middle gear 6c interlocks with the pinion gear 5c.

The rotor 3 can rotate around the first axis X in the lengthwise direction in relation to the reel body 2. The rotor 3 is rotatably and integrally coupled to the pinion gear 5c. The rotor 3 includes a roughly cylinder-shaped rotor body 3a that is coupled to the pinion gear 5c, a first rotor arm 3b, and a second rotor arm 3c, the first and second rotor arms 3a and 3b extending from respective sides of the rotor body 3a. The rotor 3 also includes a bail arm 3d that is pivotally coupled to the first rotor arm 3b and the second rotor arm 3c. The bail arm 3d is provided to wind fishing line onto a spool 4.

The rotor 3 can be switched between the prohibit-reversal state and the allow-reversal state, with an anti-reversal mechanism 50 provided with a roller-type one-way clutch 51. This switching operation is carried out with a switch lever (omitted from the drawings) that is disposed below the reel body 2.

The spool 4 is disposed between the first rotor arm 3b and the second rotor arm 5c of the rotor 3. The spool 4 is mounted to the extreme end of the spool shaft 15 via a drag mechanism 60. The spool 4 includes a fishing line winding drum portion 4a whereto fishing line is wound on the periphery, a cylindrical skirt portion 4b that is integrally formed to the fishing line winding drum portion 4a at the rear of the fishing line winding drum portion 4a, and a flange portion 4c with a large diameter provided to the front end of the fishing line winding drum portion 4a.

The drag mechanism 60 is the mechanism for braking rotation of the spool 4 and includes a drag adjustment knob 61 that is screwed to the extreme end of the spool shaft 15 and a brake portion 62 that is pressurized by the drag adjustment knob 61 and applies a braking force to the spool 4.

Features

The embodiment described above can be expressed as follows.

(1) The reel body 2 is the reel body of a spinning reel capable of delivering fishing line forward and includes a housing 21, a cover member 22, and a guard member 23. The housing 21 has a housing space 21a, wherein the first side face is opened, a sidewall 21b that demarcates the second side face of the housing space 21a and opposes the first side face, and a rear wall 21c that demarcates the rear face of the housing space 21a. The protruding piece 21d, which is the rear portion of the sidewall 21b, extends more toward the rear than the rear wall 21c. The cover member 22 is mounted to the housing 21 to cover the opening of the housing space 21a. The guard member 23 is mounted from the rear of the housing 21 and the cover member 22 to form a space between the protruding piece 21d and the rear wall 21c.

According to this configuration, the protruding piece 21d, which is the rear portion of the sidewall 21b, extends more toward the rear than the rear wall 21c. Therefore, the rear portion of the housing 21 can have about the same external appearance as that of the conventional art. Also, the rear wall 21c is positioned more toward the front than the rear end of the housing 21. Therefore, the guard member 23 can be mounted to the housing 21 forming a space between the protruding piece 21d and the rear wall 21c. Accordingly, decreasing the weight of the reel body 2 is made possible without forfeiting the design and functionality of the rear portion of the reel body 2.

(2) The rear portion 22a of the cover member 22 extends more toward the rear than the rear wall 21c. According to this configuration, a space is formed at the rear portion of the reel body 2 by the protruding portion 21d, the rear wall 21c of the housing 21, the rear portion 22a of the cover member 22, and the guard member 23. Accordingly, decreasing the weight of the reel body 2 is made possible without forfeiting the design and the functionality when viewed from the side mounted with the cover member 22.

(3) The rear portion 22a of the cover member 22 has the same shape as the protruding piece 21d when viewed from the side. According to this configuration, the reel body 2 is bilaterally symmetrical. Therefore, the design and the functionality are enhanced, and balance is achieved in the mounting strength.

(4) The guard member 23 has a shape wherein the front face 23b follows along the rear face 21p of the sidewall and the rear face 22b of the cover member 22 when viewed from the side. According to this configuration, the adhesion for mounting the guard member 23 to the housing 21 and the cover member 22 is enhanced, and the mounting strength is enhanced.

(5) The guard member 23 has at least one protruding portion 23c that protrudes forward. Also, the protruding portion 23c is disposed at a position capable of making contact with the inside face of the protruding piece 21d. According to this configuration, even in a case where a load is applied to the guard member 23 from the side, a sideways movement of the guard member 23 is restricted by the protruding portion 23c making contact with the inside face of the protruding piece 21d, and a sideways displacement in the position of the guard member 23 can be prevented.

(6) The guard member 23 has multiple protruding portions 23c. At least one protruding portion 23c is disposed at a position capable of making contact with the inside face of the rear portion 22a of the cover member 22. According to this configuration, a sideways movement of the guard member 23 is restricted also by the protruding portion 23c making contact with the inside face of the rear portion 22a of the cover member 22. Therefore, a sideways displacement in the position of the guard member 23 can surely be prevented.

(7) The spinning reel includes the reel body 2, a handle 1 that is rotatably mounted to the reel body 2, a spool 4 whereon fishing line is wound, and a rotor 3 for winding fishing line on the spool 4. According to this configuration, the reel body 2 that was described above is provided. Therefore, the weight can be reduced without forfeiting the design and functionality.

Modifications

An embodiment of the present invention was described above. However, the present invention is not limited to the embodiment described above, and various changes are possible in a scope not deviating from the essence of the invention. In particular, the multiple embodiments and modifications described in the specification can be optionally combined as needed.

Modification 1

Figure 8:
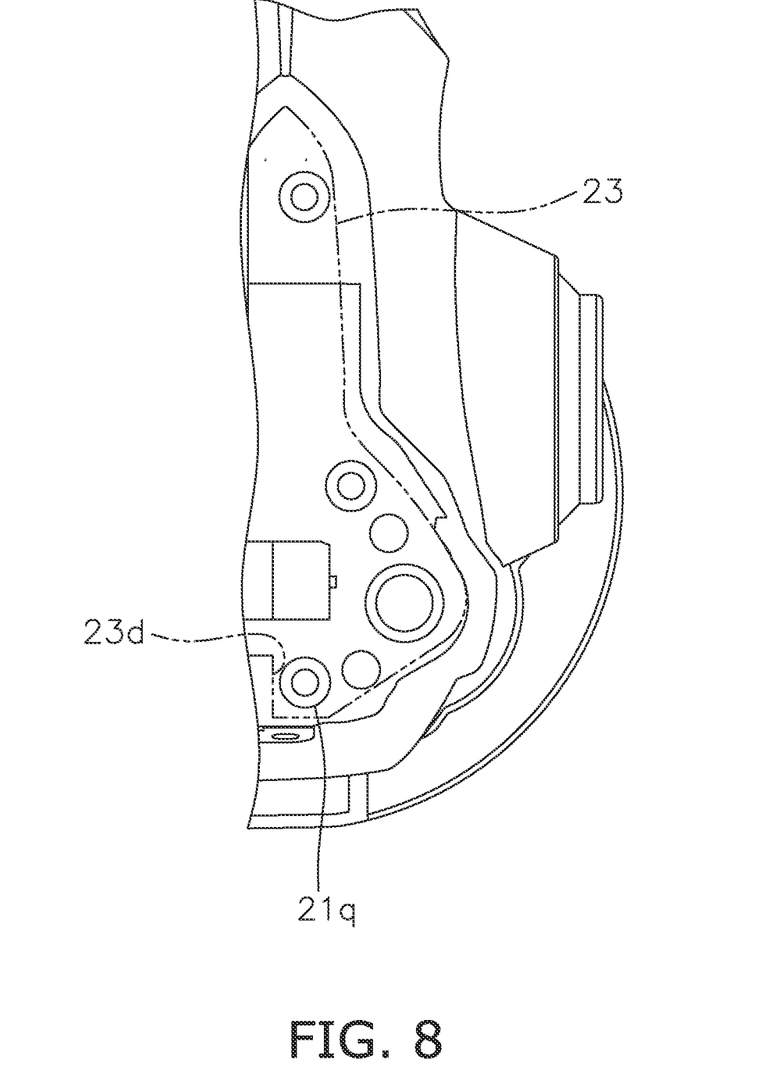
FIG. 8 is a back elevational view of a housing related to a first modification.

As illustrated in FIG. 8, it is possible to form an escape portion 23d on the inside of the guard member 23 according to a T-slot milling process or the like. According to this escape portion 23d, it is possible to prevent the protruding portion 21q that protrudes rearward from the rear face 21e of the rear wall 21c from interfering with the inside face of the guard member 23. As a result, the bottom face of the guard member 23 can be shifted in the upward direction. Accordingly, the bottom face of the guard member 23 does not protrude downward in relation to the housing 21 even if for example, sack holes for the bolts to fasten the guard member 23 and the housing 21 are formed on the bottom face of the guard member 23.

Modification 2

In the embodiment described above, the protruding piece 21d was described to be one portion (the rear portion) of the sidewall 21b. However, the protruding piece 21d can be a separate member from the sidewall 21b. Namely, the protruding piece 21d is formed along one section of one of the side edges (the right-side edge in FIG. 3) of the rear wall 21c, and the outside face of the protruding piece 21d is formed smoothly and continuously to the outside face of the sidewall 21b.

Modification 3

The guard member 23 need not have the protruding portion 23c. Also, the rear portion 22a of the cover member 22 and the protruding piece 21d can have varying shapes in the side view.

What is claimed is:

1. A spinning reel body for delivering fishing line forward, the spinning reel body comprising:
    a housing including an internal housing space, a sidewall that forms a side face of the housing space, and a rear wall that forms a rear face of the housing space, the housing space having an open side opposite the side face formed by the sidewall, the sidewall having a rear portion extending beyond the rear wall in a rearward direction;
    a cover member mounted to the housing and covering the open side of the housing space; and
    a guard member mounted at the rear wall of the housing and at a rear portion of the cover member to form a space between the rear portion of the sidewall and the rear wall of the housing.

2. The spinning reel body according to claim 1, wherein the rear portion of the cover member extends beyond the rear wall of the housing in the rearward direction.

3. The spinning reel body according to claim 2, wherein the guard member has at least one protruding portion that protrudes forward relative to the rearward direction, the protruding portion being arranged to contact an inside face of the rear portion of the sidewall.

4. The spinning reel body according to claim 2, wherein the guard member has a plurality of protruding portions, each of the protruding portions protruding forward and being arranged to contact an inside face of the rear portion of the housing or an inside face of the rear portion of the cover member.

5. The spinning reel body according to claim 2, wherein the rear portion of the cover member and the rear portion of the sidewall have matching shapes as viewed in a side elevational view of the reel body.

6. The spinning reel body according to claim 2, wherein a front face of the guard member has a shape that follows along a rear face of the rear portion of the sidewall and along a rear face of the rear portion of the cover member as viewed in a side elevational view of the reel body.

7. The spinning reel body according to claim 1, wherein the guard member has at least one protruding portion that protrudes forward relative to the rearward direction, the protruding portion being arranged to contact an inside face of the rear portion of the sidewall.

8. The spinning reel body according to claim 7, wherein a front face of the guard member has a shape that follows along a rear face of the rear portion of the sidewall and along a rear face of the rear portion of the cover member as viewed in a side elevational view of the reel body.

9. The spinning reel body according to claim 1, wherein a front face of the guard member has a shape that follows along a rear face of the rear portion of the sidewall and along a rear face of the rear portion of the cover member as viewed in a side elevational view of the reel body.

10. A spinning reel including the spinning reel body of claim 1, and further comprising
    a handle rotatably mounted to the spinning reel body;
    a spool configured to have fishing line wound thereon; and
    a rotor operatively coupled between the handle and the spool to wind the fishing line on the spool.

11. A spinning reel including the spinning reel body of claim 1, wherein
    the rear portion of the sidewall is a protruding member that has a triangular shape and has an apex at a rear end thereof.

* * * * *